United States Patent [19]

Knoll

[11] Patent Number: 4,789,328
[45] Date of Patent: Dec. 6, 1988

[54] HOT/COLD PRESS FORMING APPARATUS FOR THERMOFORMABLE PLASTIC MATERIALS

[75] Inventor: Frederick L. Knoll, Kent, Wash.
[73] Assignee: The Boeing Company, Seattle, Wash.
[21] Appl. No.: 52,622
[22] Filed: May 20, 1987
[51] Int. Cl.$^4$ .............................................. B29C 51/08
[52] U.S. Cl. ..................... 425/384; 425/394; 425/397; 425/403.1
[58] Field of Search ............... 425/390, 384, 394, 395, 425/397, 400, 402, 347, 348, 403.1; 264/320, 322

[56] References Cited

U.S. PATENT DOCUMENTS

| | | | |
|---|---|---|---|
| 2,691,798 | 10/1954 | Winchester et al. | 425/384 |
| 3,026,566 | 3/1962 | Martelli et al. | 425/388 |
| 3,183,291 | 5/1965 | Miller et al. | 264/294 |
| 3,256,564 | 6/1966 | Welshon | 425/384 |
| 3,533,352 | 10/1970 | Miller | 100/93 |
| 3,844,701 | 10/1974 | Rockwell | 425/348 |
| 3,939,024 | 2/1976 | Hoggatt | 156/242 |
| 3,993,787 | 11/1976 | Nakabayashi et al. | 425/348 |
| 4,043,729 | 8/1977 | Paracchi | 425/384 |
| 4,060,364 | 11/1977 | Gras | 425/384 |
| 4,190,408 | 2/1980 | Bronkema et al. | 425/397 |
| 4,284,396 | 8/1981 | Thissen et al. | 425/397 |
| 4,532,093 | 7/1985 | O'Malley et al. | 425/348 |
| 4,613,393 | 9/1986 | Cattanach et al. | 156/323 |

OTHER PUBLICATIONS

Shepard Sikes, Machine Design, May 22, 1986, pp. 68-71.
Joseph P. Reardon, Advanced Composites, Mar./Apr. 1987, pp. 98-99.
ICI Fiberite, APC-2 Peek/Carbon Fibre Composite, Data Sheet 1: Product forms of Aromatic Polymer Composite, APC-2, 1986.
ICI Fiberite, APC-2 Peek/Carbon Fibre Composite, Data Sheet 2: Making Consolidated Sheet from Aromatic Polymer Composite, APC-2, 1986.
ICI Fiberite, APC-2 Peek/Carbon Fibre Composite, Data Sheet 5: Fabricating with Aromatic Polymer Composite, APC-2, 1986.

*Primary Examiner*—Willard Hoag
*Attorney, Agent, or Firm*—Paul C. Cullom, Jr.; B. A. Donahue

[57] ABSTRACT

One apparatus for forming a workpiece made of thermoformable plastic material includes: (a) a base member; (b) a positioning wheel or a positioning frame supported by the base member; (c) a suspension tray for supporting a raw workpiece, the suspension tray being supported by the positioning wheel or the positioning frame; (d) a pair of relatively hot dies; (e) a first support arm positioning the hot dies, the first support arm being supported by the base member; (f) a first cylinder mounted on the base member for moving the first support arm whereby the hot dies may be positioned above and below the raw workpiece; (g) a pair of relatively cold dies; (h) a second support arm positioning the cold dies, the second support arm being supported by the base member; (i) a second cylinder mounted on the base for moving the second support arm whereby the set of cold dies may by positioned above and below the workpiece; (j) a press platen; and, (k) a cylinder for moving the press platen whereby the hot dies may be closed upon the workpiece when the pair of hot dies is in position above and below the workpiece and the cold dies may be closed upon the workpiece when the pair of cold dies is in position above and below the workpiece.

19 Claims, 6 Drawing Sheets

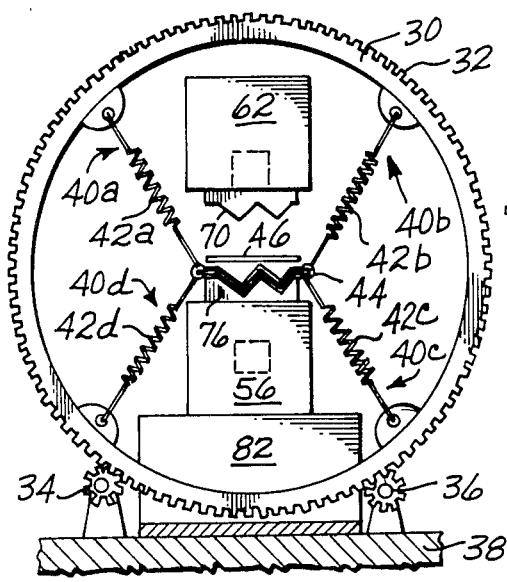
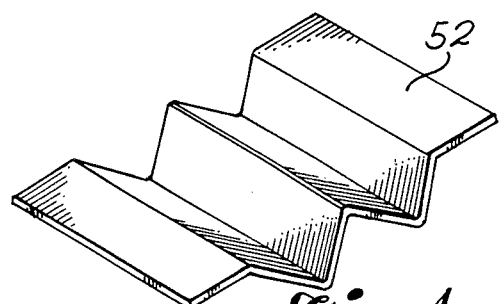
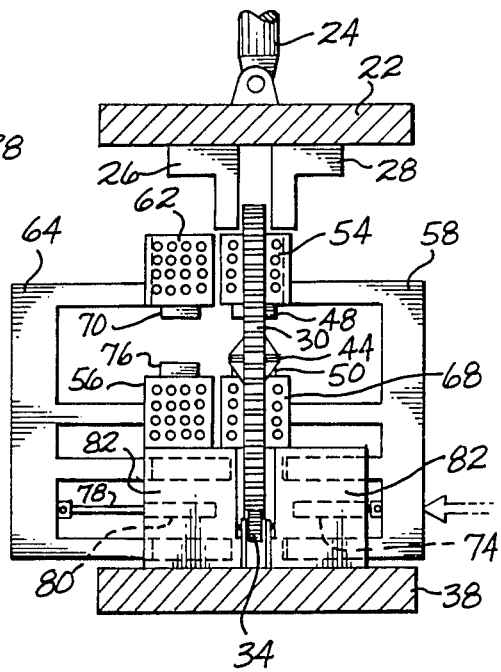
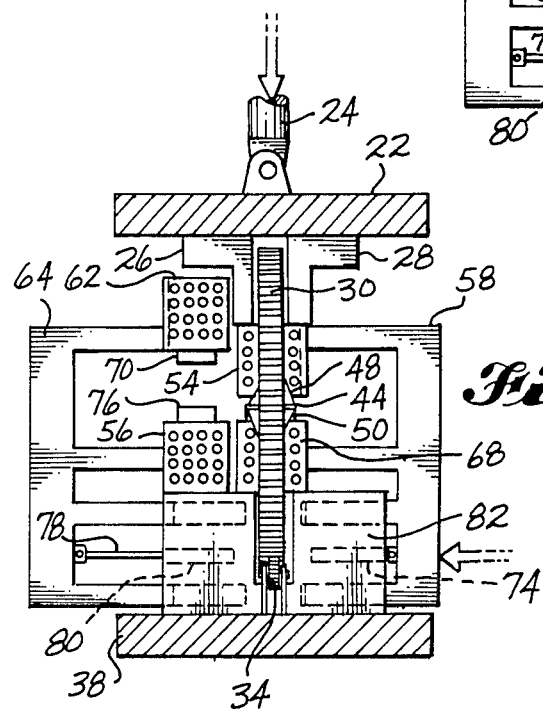

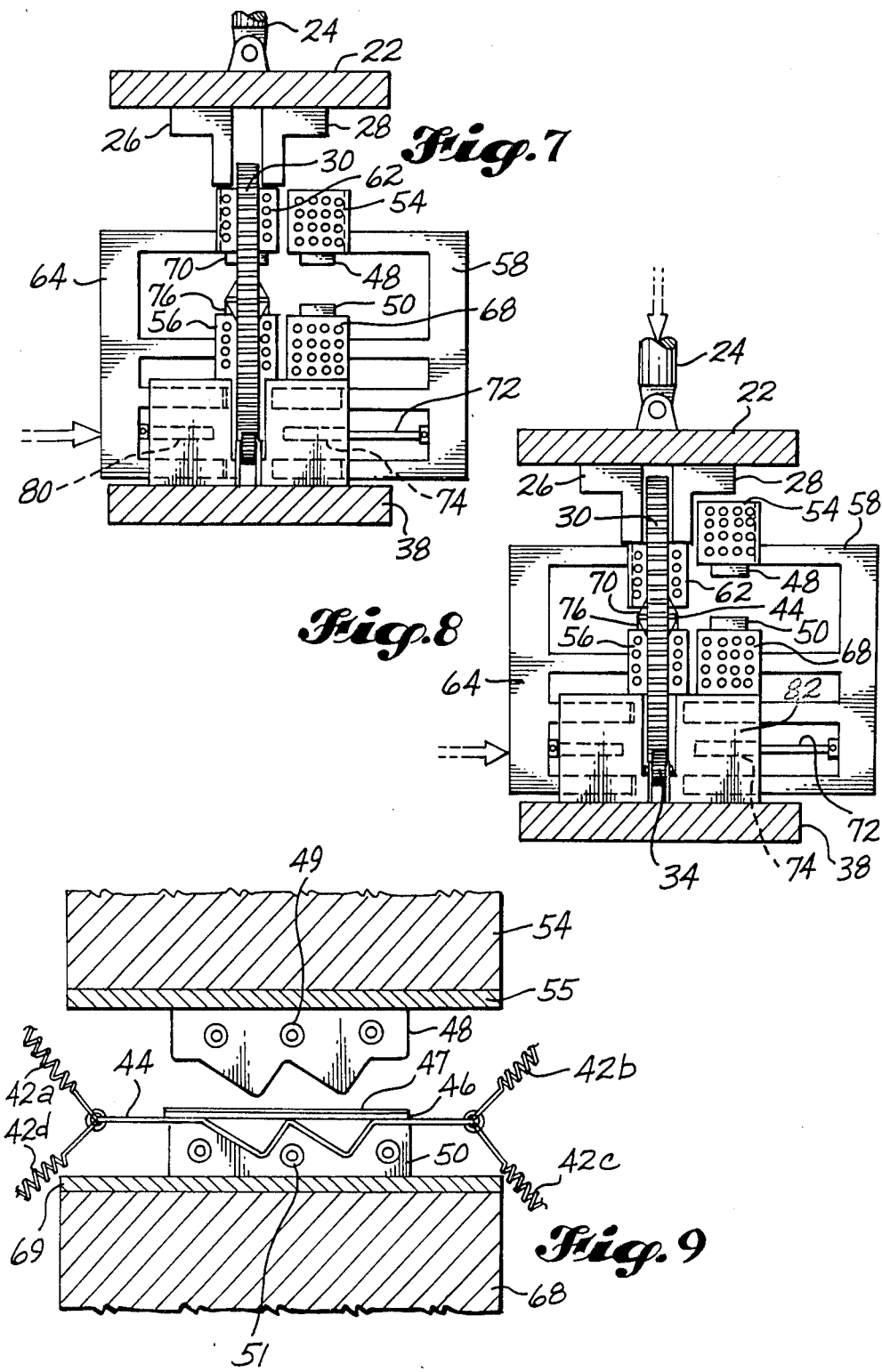

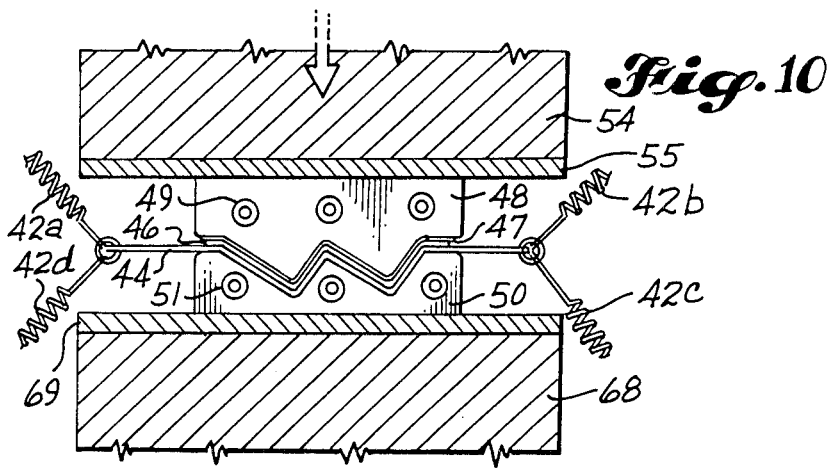
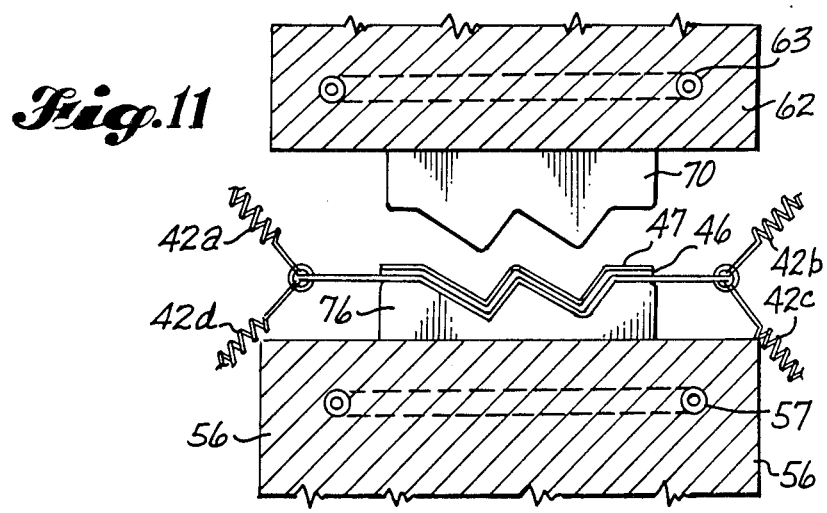
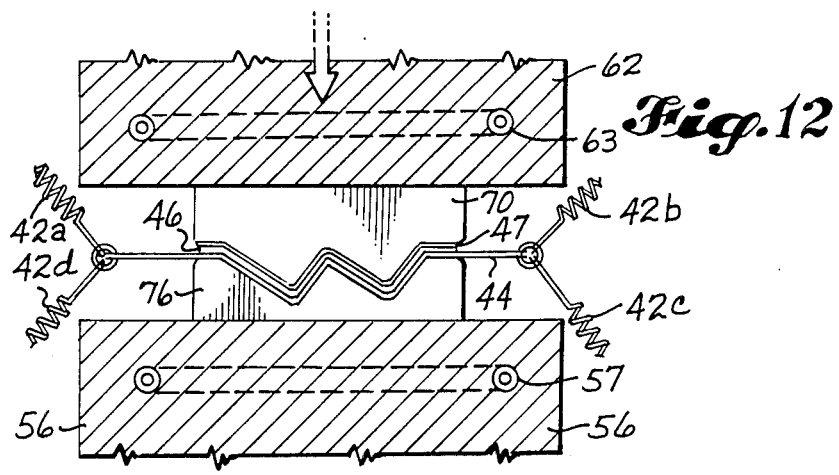

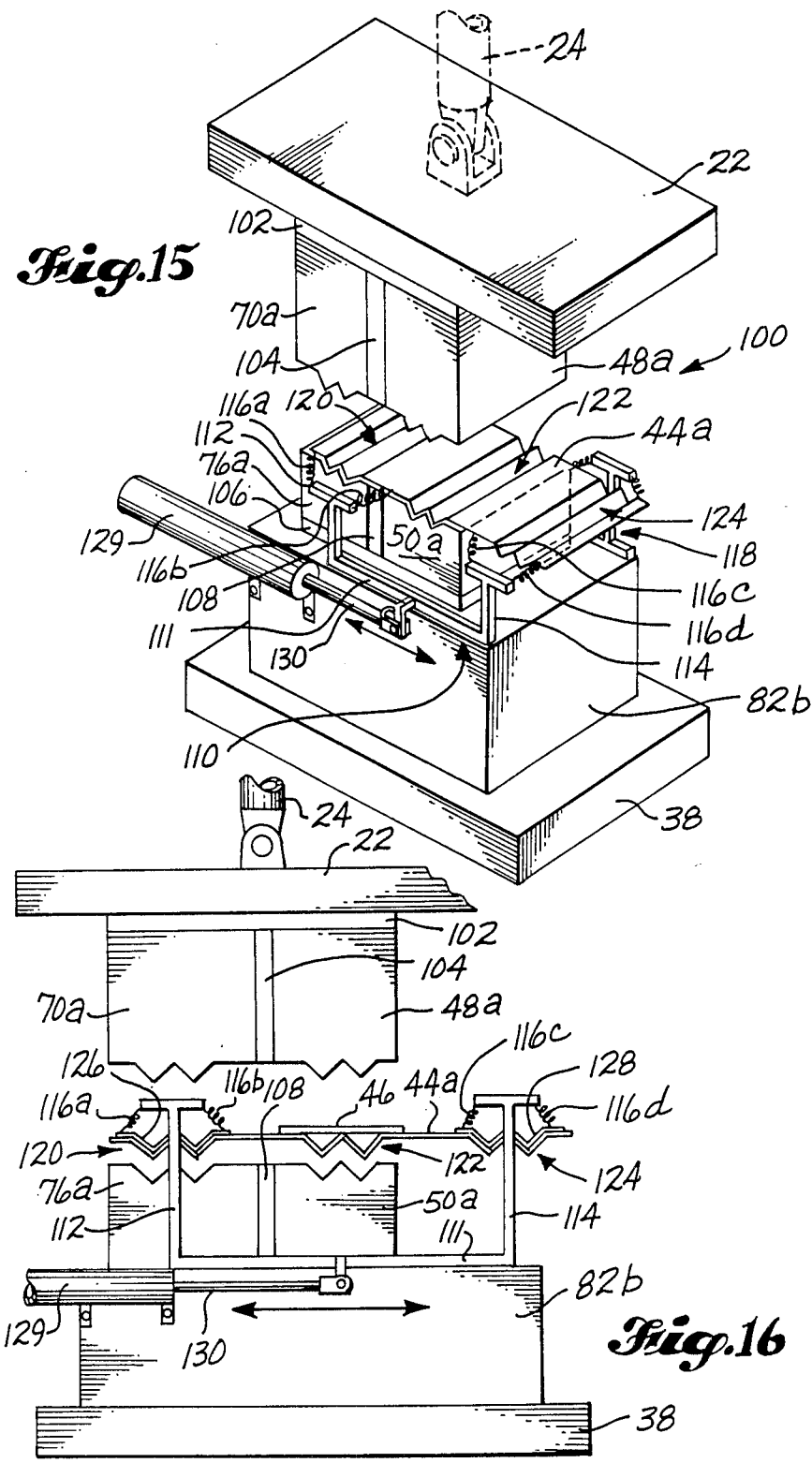

HOT/COLD PRESS FORMING APPARATUS FOR THERMOFORMABLE PLASTIC MATERIALS

BACKGROUND OF THE INVENTION

(1) Field of the Invention

The invention relates to apparatus and methods for forming and shaping a workpiece made of thermoformable plastic material. The broad term "thermoformable plastic material" is defined to include materials which contain thermoplastic resins and thermosetting resins. Thermoplastic resins are defined as materials which have the property of softening or fusing when heated and of hardening and becoming rigid again when cooled. Thermosetting resins are defined as materials which have the property of becoming permanently hard and rigid when heated to a critical temperature.

One important type of thermoplastic material is thermoplastic composite material. Thermoplastic composite materials are combinations of a thermoplastic resin and another material differing in composition or form. The constituents retain their physical identities in the composite material, that is, they do not dissolve or otherwise merge completely into each other although they act together. Advanced composite materials are composite materials made by embedding high-strength, high-modulus fibers within an essentially homogeneous matrix. In one particular example, the invention relates to an apparatus and method for forming and shaping aerospace parts made of advanced thermoplastic composite materials. Advanced thermoplastic composites are now being employed as lightweight structural materials in many aerospace uses.

(2) Description of the Related Art

Currently, press forming or shaping of parts made of advanced thermoplastic composite materials for aerospace use is generally accomplished by heating a pre-consolidated sheet or blank of material in an oven to 750°-800° F. and then transferring it by hand to a press as fast as possible where it is formed between dies before it cools. This process is difficult, cumbersome, and time-consuming. In many cases, the blank of material will cool below the melting temperature and begin solidification before the dies can be closed. Forming the part this way will result in damage to the material. Manual handling of the material blanks at elevated temperatures (750°-800° F.) requires thick heat-resistant gloves and this makes accurate positioning of the blank in relation to the dies very difficult.

There is also a process for consolidating flat sheets of advanced thermoplastic composites that is known in the art. The process involves stacking thin layers of flat blanks of thermoplastic composite material. The stack of flat sheets is heated by being placed in a press with hot platens. The hot material is then transferred by hand to another press with cold patens where the material is pressed flat and held under pressure until cooled. Here again the problem is that the material cools rapidly while being moved between presses and, if used to form shaped parts, accurately positioning the hot blanks relative to the dies by hand would be difficult.

SUMMARY OF THE INVENTION

One method of the present invention begins by supporting a raw workpiece on a suspension tray. Then a pair of relatively hot dies is moved into position above the workpiece and below the suspension tray. Next the relatively hot dies are closed against the workpiece and the suspension tray to heat the workpiece and to form and shape the workpiece into the desired configuration. In one embodiment, a positioning wheel is used to rotate the workpiece in relation to the dies while working the workpiece into its final configuration. Then the relatively hot dies are opened and moved away from the workpiece and the suspension tray. Next a pair of relatively cold dies is moved into position above the workpiece and below the suspension tray. Then the relatively cold dies are closed against the workpiece and the suspension tray to cool the workpiece while maintaining the workpiece in the desired configuration. Finally, the relatively cold dies are opened and the finished workpiece is removed from the suspension tray.

One apparatus of the present invention includes: (a) a base platen; (b) a positioning wheel supported by the base platen; (c) a suspension tray for supporting a raw workpiece, the suspension tray being supported by the positioning wheel; (d) a base member supported on the base platen; (e) a pair of relatively hot dies; (f) a first support arm for supporting and positioning the relatively hot dies, the first support arm being supported by the base member; (g) a first cylinder mounted on the base member for moving the first support arm whereby the relatively hot dies may be positioned above the raw workpiece and below the suspension tray; (h) a pair of relatively cold dies; (i) a second support arm for supporting and positioning the relatively cold dies, the second support arm being supported by the base member; (j) a second cylinder mounted on the base member for moving the second support arm whereby the relatively cold dies may be positioned above the workpiece and below the suspension tray; (k) a press platen; and (l) a cylinder for moving the press platen whereby the relatively hot dies may be closed upon the raw workpiece and the suspension tray when the pair of relatively hot dies is in position above and below the raw workpiece and the relatively cold dies may be closed upon the workpiece and the suspension tray when the pair of relatively cold dies is in position above and below the workpiece.

Platen and consequent die alignment may be accomplished by using conventional press tie rods which structurally tie together the press headframe and the base platen. However, conventional tie rods are not considered essential because die alignment may be accomplished in a variety of ways. Moreover, a variety of press designs can employ the foregoing inventive combination of a pair of relatively hot dies and a pair of relatively cold dies in a single press apparatus.

The present invention solves the problems previously existent in the following ways. By placing the raw workpiece material on a suspension tray, the workpiece can be positioned on a low temperature member that can be rotated mechanically in relation to the dies. If needed, a cover sheet or film may be placed on top of the workpiece to prevent sticking to the upper hot die. The motion of the suspension tray relative to the relatively hot dies can be sequenced and programmed to form one area before another area, similar to hand working. In other cases, pre-plied stack ups can be formed and consolidated in finished parts saving the expense of putting the material into pre-consolidated sheet form. Heat is transferred into the raw workpiece by radiation and/or convection by a slow clamping motion. This method enables the press operator to do all of the handling of the material when it is at a low temperature and solidified, thereby eliminating all the problems of handling a hot limber material when working thermoplastics. The dies can be moved in and out rapidly without the workpiece being thrown off or out of position because the workpiece stays on the suspension tray in the center of the press. By using both a relatively hot set and a relatively cold set of dies, the process of heating, forming, and cooling the work material can be speeded up significantly especially when the workpiece is an advanced thermoplastic composite material which has to be heated to the relatively high temperature of approximately 750° F. Heating a set of dies to this temperature and then cooling the same set of dies again to room temperature could take several hours. Using separate die sets for heating and cooling enables the heating and cooling process to be accomplished in a matter of minutes.

Another advantage of the present invention is that high cost die finishing is not always required because the suspension tray and the cover sheet (if used) contact the workpiece and in doing so impart their finish on the workpiece. In this manner, a variety of textures and finishes can be molded by changing the cover sheet and suspension tray finish rather than the die.

BRIEF DESCRIPTION OF THE DRAWINGS

FIG. 3 is a partial vertical sectional view taken along line 3—3 in FIG. 2 showing the positioning wheel and the suspension tray with the suspension tray supporting a raw workpiece. The press platen and the pressure transfer blocks have been omitted for clarity.

FIG. 4 is an isometric view of a finished thermoformable plastic workpiece having a Z-shape.

FIG. 5 is a front elevational view of the inventive apparatus of FIG. 1 showing the right hand set of dies (the relatively hot dies) in position above the workpiece and below the suspension tray before press closing.

FIG. 6 is a front elevational view of the inventive apparatus of FIG. 1 showing the press platen down and the relatively hot dies in the closed position on the workpiece and the suspension tray.

FIG. 7 is a front elevational view of the inventive apparatus of FIG. 1 showing the left hand set of dies (the relatively cold dies) in position above the workpiece and below the suspension tray before press closing.

FIG. 8 is a front elevational view of the inventive apparatus of FIG. 1 showing the press platen down and the relatively cold dies in the closed position on the workpiece and the suspension tray.

FIG. 9 is a side elevational view of the apparatus of FIG. 5 showing the raw workpiece supported on the suspension tray between the relatively hot dies with a cover sheet on top of the workpiece to prevent sticking to the upper die. The relatively hot dies are in the open position before press closing. The die mounts are shown in vertical section.

FIG. 10 is a side elevational view of the apparatus of FIG. 6 showing the workpiece supported on the suspension tray at the point in the forming process when the relatively hot dies are in the fully closed position and the workpiece has been formed into the desired shape.

FIG. 11 is a side elevational view of the apparatus of FIG. 7 showing the workpiece supported on the suspension tray between the relatively cold dies. The relatively cold dies are in the open position. The die mounts are shown in vertical section.

FIG. 12 is a side elevational view of the apparatus of FIG. 8 showing the workpiece supported on the suspension tray between the relatively cold dies which are in the closed position to cool the workpiece.

FIG. 15 is an isometric view of a third embodiment of a hot/cold press forming apparatus constructed according to the principles of the present invention. The actuating rod for the press platen is shown in phantom.

FIG. 16 is a front elevational view of the apparatus of FIG. 15 and shows the positioning frame and suspension arms supporting the suspension tray at a level that gives it clearance for movement above the lower dies.

DESCRIPTION OF THE PREFERRED EMBODIMENTS

Figure 1:
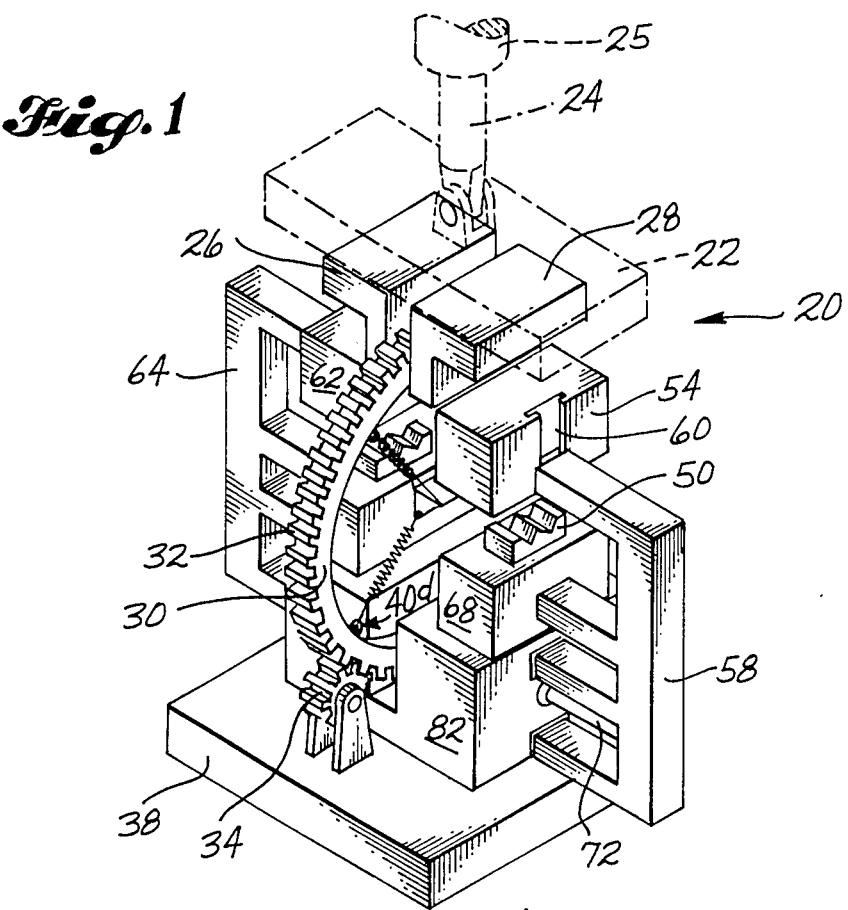
FIG. 1 is an isometric view of a first embodiment of a hot/cold press forming apparatus constructed according to the principles of the present invention. The press platen and its actuating cylinder and rod are shown in phantom. Conventional press tie rods, which may be employed, are not shown in these drawings.
Figure 2:
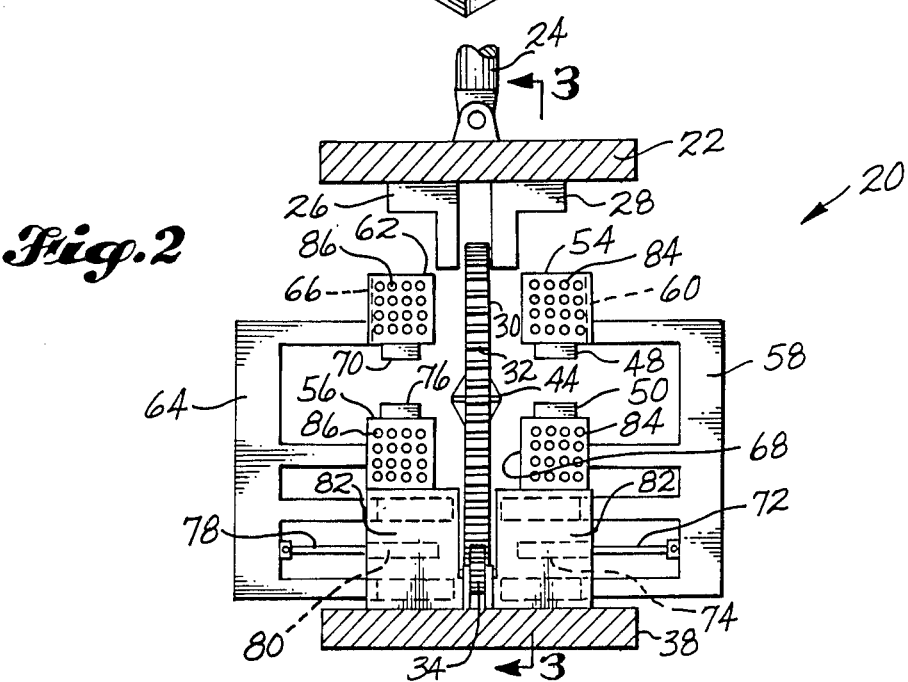
FIG. 2 is a front elevational view of the inventive apparatus of FIG. 1 showing the apparatus in the material load/unload position.

Three apparatus embodiments of the invention will be described first. Referring to the drawings, FIGS. 1 and 2 show the first embodiment of a hot/cold press forming apparatus 20 contructed according to the principles of the invention. The terms "hot" and "cold" are used in a relative sense to mean that there exists a temperature differential between the two pairs of forming dies. The apparatus 20 includes a press platen 22 which is vertically actuated by a rod 24. Rod 24 is driven by a conventional double-acting cylinder 25 of either the hydraulic or pneumatic type. Cylinder 25 is mounted on a headframe (not shown) or a non-moving structure above press platen 22. Other conventional press activating mechanisms may be employed in lieu of the cylinder.

Platen 22 has mounted on its lower face two pressure transfer blocks 26 and 28 in a spaced-apart relationship. Pressure transfer blocks 26 and 28 are shown as separate members in the drawings, but they may be constructed in a variety of other ways such as integral parts of platen 22. In the center portion of apparatus 20 is a positioning wheel 30, the upper portion of which is located between pressure transfer blocks 26 and 28. As shown in FIG. 3, positioning wheel 30 is circular in shape and its outer periphery carries teeth 32. Teeth 32 engage gears 34 and 36 which support positioning wheel 30. Gears 34 and 36 are mounted on base platen 38.

Base platen 38 may be omitted from the construction of apparatus 20, in which event base member 82 may rest directly on the factory floor and be aligned by other means. Gears 34 and 36 may also be mounted on the factory floor or be mounted on arms extending out from base member 82. Gear 36 is powered by a reversible motor (not shown), so that positioning wheel 30 can be rotated in either direction by programmable controls or the press operator.

Positioning wheel 30 has four adjustable suspension arms 40a, 40b, 40c, and 40d mounted inside the wheel. The arms include a section constructed of springs 42a, 42b, 42c, and 42d or of an elastic material. The four suspension arms each have Y-shaped harnesses which are attached to and support a suspension tray 44 located at the center of the wheel 30. As shown in FIGS. 9 and 11 suspension tray 44 is supported at a level that gives minimum clearance above the lower dies 50 and 76.

As shown in FIGS. 3 and 9, suspension tray 44 supports the raw workpiece 46 which is to be formed and shaped by the press. A cover sheet or film 47 (FIG. 9) may optionally be used on top of and/or below the workpiece 46. Suspension tray 44 is a preformed member, preferably made out of thin sheet metal (such as aluminum alloy or stainless steel), and having a shape which is similar to the forming dies. For example, suspension tray 44, upper hot die 48, and lower hot die 50 may all have a Z-shape in side view as shown in FIG. 9. A thin sheet made in a shape generally conforming to the die pairs is to be understood by the work "tray" when used herein. This is the shape of the finished workpiece 52 as shown in FIG. 4. It is to be understood that the Z-shape is shown by way of example only and that a variety of other shapes may be used in practicing the invention. Suspension tray 44 is shown as a solid member in the drawings but it may be modified to provide for the application of a vacuum through the suspension tray to hold the workpiece in place.

As shown in FIG. 9, the upper hot die mount 54 and the lower hot die mount 68 have external insulation boards 55 and 69 to insulate the die mounts form the upper hot die 48 and the lower hot die 50, respectively. Upper hot die 48 and lower hot die 50 are heated by heating elements 49 and 51, respectively. Dies 48 and 50 each have conventional temperature gauge and control capabilities such as internal thermocouples (not shown). Upper die mount 54 is attached to the right support arm 58 by means of a sliding track 60 as shown in FIG. 1 which has either a spring-driven or a cylinder-driven return so that when platen 22 and pressure transfer blocks 26 and 28 are retracted then upper die mount 54 will return to its elevated or open position. The small holes 84 in the side walls of die mounts 54 and 68 are to lighten the weight of the die mounts and to cool them.

Right support arm 58 supports upper hot die mount 54 and is attached to lower hot die mount 68, wherby both move horizontally left and right with support arm 58. Lower hot die mount 68 slides horizontally on top of base member 82. A guide or track (not shown) may be used for reduced friction and better alignment. Lower die mount 68 does not move vertically, whereas upper die mount 54 moves up and down in response to platen 22 and pressure transfer blocks 26 and 28 when right support arm 58 is in the retracted or pressing position (FIGS. 5 and 6). Right support arm 58 is moved horizontally by rod 72 which is driven by a double-acting cyliner 74 of either the hydraulic or pneumatic type mounted in the right side of base 82 which also supports right support arm 58.

As shown in FIG. 11, the upper cold die mount 62 and the lower cold die mount 56 have internal cooling elements 63 and 57 for cooling the upper cold die 70 and the lower cold die 76, respectively. Dies 70 and 76 each have conventional temperature gauge and control capabilities such as internal thermocouples (not shown).

Upper cold die mount 62 is attached to the left support arm 64 by means of a sliding track 66 (shown in phantom in FIG. 2) which has either a spring-driven or a cylinder-driven return so that when platen 22 and pressure transfer blocks 26 and 28 are retracted then upper die mount 62 will return to its elevated or open position. The small holes 86 in the side walls of die mounts 56 and 62 are to lighten the weight of the die mounts and to cool them.

Left support arm 64 supports upper cold die mount 62 and is attached to lower cold die mount 56, whereby both move horizontally left and right with support arm 64. Lower cold die mount 56 slides horizontally on top of base member 82. A guide or track (not shown) may be used for reduced friction and better alignment. Lower die mount 56 does not move vertically, whereas upper cold die mount 62 moves up and down in response to press platen 22 and pressure transfer blocks 26 and 28 when left support arm 64 is in the retracted or pressing position (FIGS. 7 and 8). Left support arm 64 is moved horizontally by rod 78 which is driven by a double-acting cylinder 80 of either the hydraulic or pneumatic type mounted in the left side of base 82 which also supports left support arm 64.

Platen alignment, that is, alignment between press platen 22 and base platen 38, and consequent die alignment may be accomplished by employing conventional press tie rods which structurally tie together the headframe (not shown) or some other non-moving structure above press platen 22 and the base platen 38. However, conventional tie rods are not considered essential because die alignment may be accomplished in other ways. A variety of press designs can employ the foregoing invention combination of a pair of relatively hot dies and a pair of relatively cold dies in a single press apparatus.

Figure 13:
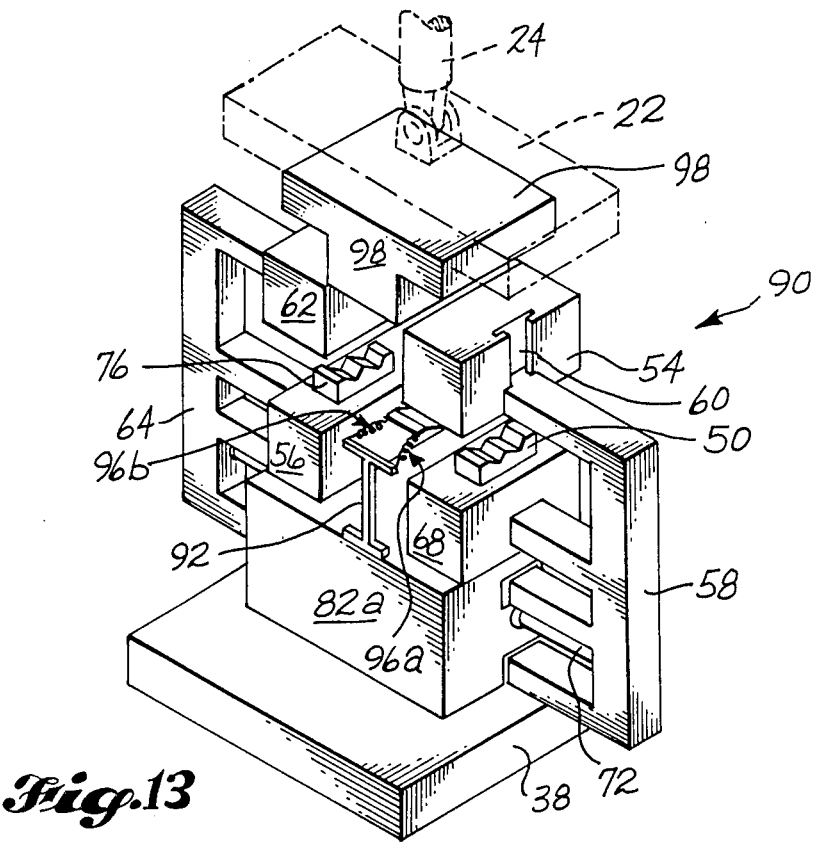
FIG. 13 is an isometric view of a second embodiment of a hot/cold press forming apparatus constructed according to the principles of the present invention. The press platen and its actuating rod are shown in phantom.
Figure 14:
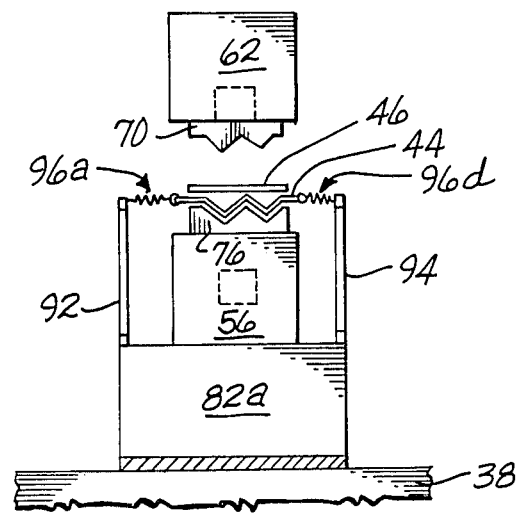
FIG. 14 is a partial vertical sectional view of the apparatus of FIG. 13 and shows the positioning posts and the suspension tray with the suspension tray supporting a raw workpiece. The press platen and the pressure transfer block have been omitted for clarity.

FIGS. 13 and 14 show the second embodiment of a hot/cold press forming apparatus 90 constructed according to the principles of the invention. The apparatus 90 is a simplified version of the apparatus 20 shown in FIGS. 1 and 2. Components of the two embodiments having like design and construction have been given the same reference numerals in the drawings.

The primary difference between the first and second embodiments is that positioning wheel 30 has been replaced by two vertical I-shaped positioning frames 92 and 94 which are mounted on base member 82a. Each of the four adjustable suspension arms 96a, 96b, 96c, and 96d have one end attached to one of the positioning frames 92 or 94 and the other end attached to suspension tray 44 located midway between the positioning frames 92 and 94. Platen 22 has mounted on its lower face a single pressure transfer block 98. Pressure transfer block 98 is shown as a separate member in FIG. 13, but it may be constructed as an integral part of platen 22. Also, in this embodiment, cylinders 74 and 80 may be combined into a single double-acting cylinder with a double-end rod. In other respects, the construction and operation of apparatus 90 is the same as apparatus 20. It is to be understood that base platen 38 may be omitted from the construction of apparatus 90 in which event base member 82 may rest directly on the factory floor.

FIGS. 15 and 16 show the third embodiment of a hot/cold press forming apparatus 100 constructed according to the principles of the invention. Apparatus 100 is designed for forming and shaping larger workpieces made of thermoformable plastic material which necessitate the use of larger and heavier dies in the press apparatus. Hence, in this embodiment, the dies are horizontally stationary and the suspension tray and workpieces are moved horizontally from one set of dies to the other set of dies. To prevent uneven loading of the press (which is undesirable), a dummy workpiece moves into position in the unused pair of dies at the same time that the real workpiece moves into position in the used pair of dies.

Apparatus 100 has certain components that are the same as in the first embodiment apparatus 20 shown in FIGS. 1 and 2. Components of the two embodiments having like design and construction have been given the same reference numerals in the drawings.

In FIGS. 15 and 16, upper hot die 48a and upper cold die 70a are mounted on the lower face of platen 22. A layer of insulation 102 separates platen 22 from dies 48a and 70a. Another layer of insulation 104 separates dies 48a and 70a from each other.

Lower hot die 50a and lower cold die 76a are mounted on base member 82b. A layer of insulation 106 separates base member 82b from dies 50a and 76a. Another layer of insulation 108 separates dies 50a and 76a from each other.

Located on the front side of apparatus 100 is a first positioning frame 110 having a horizontal member 111 and two vertical T-shaped positioning posts 112 and 114. Horizontal member 111 slides back and forth on top of base member 82b. Each of the four adjustable suspension arms 116a, 116b, 116c, and 116d have one end attached to one of the vertical positioning posts 112 and 114 and the other end attached to suspension tray 44a. A second positioning frame 118 of like design having a horizontal member and two vertical T-shaped positioning posts is located on the rear side of apparatus 100. Four more adjustable suspension arms of like design have one end attached to one of the vertical positioning posts of positioning frame 118 and the other end attached to suspension tray 44a.

Positioning frame 110 is moved back and forth in a horizontal plane by rod 130 which is connected through a linkage to horizontal member 111. Rod 130 is driven by a conventional double-acting cylinder 129 mounted on the front side of base member 82b. A second cylinder and rod combination of identical design is mounted on the rear side of base member 82b to move positioning frame 118 back and forth in a horizontal plane in tandem with positioning frame 110 so that suspension tray 44a is maintained in correct alignment with the dies. Alternatively, the cylinders can be mounted on the factory floor or some other non-moving structure. The positioning frames could also be designed as one piece tied together with cross members, and in that event, one cylinder could be employed instead of two.

Suspension tray 44a has three work stations 120, 122, and 124. As shown in FIG. 16, a real workpiece 46 is placed on the second work station 122 and dummy workpieces 126 and 128 are placed in the first and third work stations 120 and 124, respectively. The dummy workpieces prevent the undesirable situation of uneven loading of the press. When the real workpiece 46 is being pressed by either the pair of hot dies 48a and 50a or the cold dies 70a and 76a, there is a dummy workpiece of equal thickness being pressed by the other pair of dies.

FIG. 16 also shows that when the dies are in the open position suspension tray 44a is held by the suspension arms at a level that gives clearance above the highest portions of lower dies 50a and 76a so that suspension tray 44a can move freely back and forth in a horizontal plane without bumping the lower dies. In other repects, the construction and operation of apparatus 100 is similar to apparatus 20 described earlier.

The method embodiments of the invention will now be described. The processes begin with the press operator heating the hot dies, such as 48 and 50 or 48a and 50a, to the desired temperature. The proper temperature of the hot dies is dependent on the particular thermoformable plastic material that is to be shaped by the apparatus 20 or 90 or 100. For example, if the raw workpiece 46 is an advanced thermoplastic composite material, then the temperature needs to be relatively high. To be specific, if the part to be made is an aerospace part, the raw workpiece 46 may be made of the commercially-available advanced thermoplastic composite material known as APC-2 sold by Fiberite Corporation. The APC-2 is supplied as a sheet material which is composed of continuous carbon fibers dispersed in a matrix of PEEK (a polyetheretherketone of repeating units). To form and shape a workpiece made of APC-2, the hot dies (48 and 50 or 48a and 50a) should be at about 750° F.

As another example, if the raw workpiece 46 is made of the commercially-available thermoplastic composite material known as polyphenylene sulfide or PPS, then the hot dies should be at about 650° F.

As a further example, if the raw workpiece 46 is made of the commercially-available thermoplastic composite material known as AZDEL sold by PPG Industries Inc., then the hot dies (48 and 50 or 48a and 50a) should be at about 450° F. The AZDEL is supplied as a sheet material which is composed of continuous glass fibers dispersed in a polypropylene matrix.

The next step is for the press operator to coat the upper working surface of suspension tray 44 or 44a with a conventional mold release agent. The workpiece, when molten, will stick to the suspension tray. When the suspension tray cools down, the finished workpiece will be released. The operator coats the suspension tray with mold release agent occasionally during each run. Cover sheet or film 47 (if used) is also coated with mold release agent.

The remaining steps in the method using apparatus 20 or 90 will now be described and following that there will be a description of the remaining steps in the method using apparatus 100. While the apparatus 20 or 90 is in the material loading position (as shown in FIG. 2 for apparatus 20), the operator places the raw workpiece 46 on top of the suspension tray 44 as shown in FIGS. 3 and 9. By using cover sheet 47 over the workpiece 46 and other forming aids (such as a second piece of shaped metal above the workpiece), either preconsolidated sheet material or ply stack ups of thermoplastic composites may be used. Step forming or bump cycles can be used for shaping complex parts or when using materials with outgassing requirements.

For apparatus 20 and 90, the operator then activates cylinder 74 to retract rod 72 as indicated by the arrow in FIG. 5. This moves right support arm 58 horizontally to the left which brings upper hot die mount 54 and lower hot die mount 68 within the plane of positioning wheel 30 as shown in FIG. 5. Upper hot die mount 54 is now positioned below pressure transfer blocks 26 and 28 and above suspension tray 44 supporting raw workpiece 46 (FIGS. 5 and 9). Lower hot die mount 68 is now positioned below suspension tray 44.

The operator then activates cylinder 25 which pushes rod 24 vertically downward as indicated by the upper arrow in FIG. 6. This downward movement of press platen 22 and pressure transfer blocks 26 and 28 forces down upper hot die mount 60 and upper hot die 48. Heat is transferred to workpiece 46 by radiation and convection from upper hot die 48 and lower hot die 50. Upper hot die 48 is lowered slowly until it touches raw workpiece 46 or cover sheet 47 if used. The operator rotates positioning wheel 30 as needed so that there is maximum contact and heat transfer from upper hot die 48 to the workpiece 46. Suspension tray 44 can move slightly up and down and sideways by virtue of the springs or elastic material in the suspension arms. The slow clamping motion of upper hot die 48 continues until the hot dies 48 and 50 are fully closed as shown in FIGS. 6 and 10. At this point, the workpiece 46 is being compression molded. The amount of pressure applied by the hot dies and the length of time the compression continues are again dependent on the particular thermoformable plastic material being employed. With thermoplastic composites, the hot dies are kept fully closed and under pressure for the time period required to completely form and shape the workpiece into the desired configuration.

The next step is to retract upwardly the press platen 22 and the pressure transfer blocks 26 and 28. Upper hot die mount 54 and upper hot die 48 return to the open position shown in FIG. 5. Then right support arm 58 is moved horizontally to the right by extending rod 72. This moves the hot dies horizontally to the right and out of the plane of positioning wheel 30 and back to the position shown in FIG. 2.

Next the operator activates cylinder 80 to retract rod 78 as indicated by the arrow in FIG. 7. This moves left support arm 64 horizontally to the right which brings upper cold die mount 62 and lower cold die mount 56 within the plane of positioning wheel 30 as shown in FIG. 7. Upper cold die mount 70 is now positioned below pressure transferred blocks 26 and 28 and above suspension tray 44 supporting workpiece 46 (FIGS. 7 and 11). Lower cold die mount 56 is now positioned below suspension tray 44.

The operator then activates cylinder 25 which pushes rod 24 vertically downward as indicated by the upper arrow in FIG. 8. This downward movement of press platen 22 and pressure transfer blocks 26 and 28 forces down upper cold die mount 62 and upper cold die 70. Upper cold die 70 continues downwardly until the cold dies 70 and 76 are fully closed as shown in FIGS. 8 and 12. At this point, the workpiece 46 is being compression molded again and simultaneously cooled by the cold dies 70 and 76, which may be at room temperature at the beginning. The amount of pressure applied by the relatively cold dies and the length of time the compression continues are again dependent on the thermoformable plastic material being employed. For example, when the workpiece is made of APC-2 to cool to below its glass transition temperature which is about 290° F. As a further example, when the workpiece is made of polyphenylene sulfide the cold dies are held closed and under pressure for the time required for the polyphenylene sulfide to cool below its glass transition temperature of about 180° F. Conventional temperature gauge and control capabilities (not shown) are provided to monitor and maintain the temperature of each cold die.

The next step is to retract upwardly the press platen 22 and the pressure transfer blocks 26 and 28. Upper cold die mount 62 and upper cold die 70 return to the open position shown in FIG. 7. Then left support arm 64 is moved horizontally to the left by extending rod 78. This moves the cold dies horizontally to the left and out of the plane of positioning wheel 30 and back to the position shown in FIG. 2. The foregoing processing may also be accomplished automatically by using programmable controls.

The operator then unloads the finished workpiece 52 (FIG. 4) from suspension tray 44. The process is then repeated on another raw workpiece 46 as described above.

The remaining steps in the method of using apparatus 100 will now be described. The operator activates cylinder 25 which pushes rod 24 vertically downward. This downward movement of press platen 22 forces down the upper dies (upper hot die 48a and upper cold 70a). Heat is transferred to workpiece 46 in the second workstation 122 (FIG. 16) by radiation and convection from upper hot die 48a and lower hot die 50a. Upper hot die 48a is lowered slowly until it touches raw workpiece 46 (or cover sheet 47 if used). Suspension tray 44a moves down with the upper dies by virtue of the springs or elastic material in the suspension arms. The slow clamping motion of upper hot die 48a continues until the hot dies 48a and 50a are closed. At this point, the workpiece 46 is being compression molded. The amount of pressure applied by the hot dies and the length of time the compression continues are again dependent on the particular thermoformable plastic material being employed. The hot dies are kept closed and under pressure of the time period required to completely form and shape the workpiece into the desired configuration.

The next step is to retract upwardly the press platen 22. The upper dies return to the open position shown in FIG. 16. Then positioning frames 110 and 118 are moved horizontally to the left by retracting rod 130 into cylinder 129 and likewise for the corresponding cylinder and rod on the rear side. This moves suspension tray 44a horizontally to the left and locates workstation 122 and workpiece 46 between upper cold die 70a and lower cold die 76a.

The operator then activates cylinder 25 which pushes rod 24 vertically downward. This downward movement of press platen 22 forces down upper cold die 70a. Upper cold die 70a continues downwardly until the cold dies 70a and 76a are closed. At this point, the workpiece 46 is again being compression molded and simultaneously cooled by the cold dies 70a and 76a. The amount of pressure applied by the cold dies and the length of time the compression continues are again dependent on the thermoformable plastic material being employed.

The next step is to retract upwardly the press platen 22. The upper dies return to the open position. The operator then unloads the finished workpiece 52 (FIG. 4) from suspension tray 44a. The process is then repeated on another raw workpiece 46 as described above.

A variation of the foregoing processes is usually required when the raw workpiece 46 is made of a thermosetting material. One example of a thermosetting material is the commercially-available thermosetting composite material which contains a polyimide resin known as PMR-15.

The following description is presented to exemplify the process for thermosetting materials, such as PMR-15, when using apparatus 20 or 90. The process is similar when using apparatus 100. A raw workpiece 46 made of PMR-15 composite should be pre-heated in an oven to a temperature of about 100°–150° F. The operator then transfers the workpiece 46 to the suspension tray 44 while the apparatus 20 or 90 is in the material loading position (as shown in FIG. 2 for apparatus 20). In this case, the cooler dies 70 and 76 additionally have heating elements which are used to pre-heat dies 70 and 76 to an intermediate temperature of about 430° F. The cooler dies 70 and 76 are then brought into position above and below the workpiece 46 by moving left support arm 64 horizontally to the right by activating cylinder 80 to retract rod 78 as indicated by the arrow in FIG. 7.

The operator activates cylinder 25 which pushes rod 24 vertically downward. The downward movement of press platen 22 forces cooler die 70 downward until cooler dies 70 and 76 are closed as shown in FIGS. 8 and 12. The workpiece 46 is thus heated to about 430° F. and compression molded by dies 70 and 76. This is an important temperature for PMR-15 composites because it is the temperature at which the solvent (used to carry the resin into the fibers) flashes off. The workpiece is allowed to soak at this temperature until the solvent is gone. The operator then opens the cooler dies 70 and 76 by retracting the press platen 22. The left support arm 64 is moved horizontally to the left by extending rod 78 in order to move cooler dies 70 and 76 to the left and away from the workpiece.

The next step is to subject the workpiece to the hotter dies 48 and 50 which have been pre-heated to a higher temperature of about 560°–580° F. which is the peak cure temperature for PMR-15 composite. The operator moves right support arm 58 to the left by activating cylinder 74 to retract rod 72 in order to position the hotter dies 48 and 50 as indicated in FIG. 5. The hotter dies 48 and 50 are then forced down by lowering press platen 22 until the hotter dies 48 and 50 are fully closed as shown in FIGS. 6 and 10. At this point, the workpiece 46 is being compression molded and cured at about 560°–580° F. The workpiece is held at this temperature for 30 minutes or more for curing.

The next step is to retract the press platen 22 and move right support arm 58 to the right by extending rod 72 in order to move hotter dies 48 and 50 to the right and away from the workpiece. The foregoing processing may also be accomplished automatically by using programmable controls.

The operator then unloads the finished workpiece 52 from suspension tray 44. The process is then repeated on another raw workpiece as described above.

As another example, if the raw workpiece 46 is made of the commercially-available thermoformable plastic material known as TORLON sold by Amoco Chemicals Co., then the cooler dies 70 and 76 should be heated to an intermediate temperature of about 430° F. and the hotter dies 48 and 50 should be heated to a higher temperature of about 700°–750° F. TORLON is a poly (amide/imide) material and it is sometimes considered to be a thermoplastic material, but for the purposes of the present invention it is processed in a manner which is similar to the process described above for thermosetting materials.

As will be apparent to those skilled in the art to which the invention is addressed, the present invention may be embodied in forms other than those specifically disclosed above, without departing from the spirit or essential characteristics of the invention. The particular embodiments of apparatus 20, 90, and 100 described above and the particular details of the processes described are therefore to be considered in all respects as illustrative and not restrictive. The scope of the present invention is as set forth in the appended claims rather than being limited to the examples of the apparatus 20, 90, and 100 and the processes set forth in the foregoing description. Any and all equivalents are intended to be embraced by the claims.

What is claimed is:

1. An apparatus for forming and shaping a workpiece made of thermoformable plastic material, which comprises:
   (a) a base means;
   (b) a positioning means supported by said base means;
   (c) a tray means for supporting a raw workpiece, said tray means being supported by said positioning means;
   (d) a first pair of dies;
   (e) a first support means for supporting said first pair of dies, said first support means being supported by said base means;
   (f) a first means mounted on said base means for moving said first support means whereby said first pair of dies may be positioned above said raw workpiece and below said tray means;
   (g) a second pair of dies;
   (h) a second support means for supporting said second pair of dies, said second support means being supported by said base means;
   (i) a second means mounted on said base means for moving said second support means whereby said second pair of dies may be positioned above said workpiece and below said tray means;
   (j) a press platen means; and
   (k) means for moving said press platen means whereby said first pair of dies may be closed against said raw workpiece and said tray means when said first pair of dies is in position above and below said workpiece and said second pair of dies may be closed against said workpiece and said tray means when said second pair of dies is in position above and below said workpiece.

2. The apparatus defined in claim 1 wherein the positioning means comprises a wheel-like member and the tray means is supported at the center of said wheel-like member.

3. The apparatus defined in claim 2 wherein the outer periphery of said wheel-like member carries teeth and said teeth engage a pair of gears which support said wheel-like member, whereby said wheel-like member can be rotated in either direction.

4. The apparatus defined in claim 2 wherein the tray means is supported at the center of said wheel-like member by a plurality of suspension means mounted inside the wheel-like member.

5. The apparatus defined in claim 1 wherein the positioning means comprises frame members mounted on said base means and the tray means is supported midway between said frame members.

6. The apparatus defined in claim 1 wherein the tray means is made of metal.

7. The apparatus defined in claim 6 wherein the tray means is made of aluminum alloy or stainless steel.

8. An apparatus for forming and shaping a workpiece made of thermoformable plastic material, which comprises:
   (a) a base platen means;

(b) a positioning means supported by said base platen means;

(c) a tray means for supporting a raw workpiece, said tray means being supported by said positioning means;

(d) a base means supported by said base platen means;

(e) a first pair of dies;

(f) a first support means for supporting said first pair of dies, said first support means being supported by said base means;

(g) a first means mounted on said base means for moving said first support means whereby said first pair of dies may be positioned above said raw workpiece and below said tray means;

(h) a second pair of dies;

(i) a second support means for supporting said second pair of dies, said second support means being supported by said base means;

(j) a second means mounted on said base means for moving said second support means whereby said second pair of dies may be positioned above said workpiece and below said tray means;

(k) a press platen means; and (l) means for moving said platen means whereby said first pair of dies may be closed against said raw workpiece and said tray means when said first pair of dies is in position above and below said workpiece and said second pair of dies may be closed against said workpiece and said tray means when said second pair of dies is in position above and below workpiece.

9. The apparatus defined in claim 8 wherein the positioning means comprises a wheel-like member and the tray means is supported at the center of said wheel-like member.

10. The apparatus defined in claim 9 wherein the outer perimeter of said wheel-like member carries teeth and said teeth engage a pair of gears which support said wheel-like member, whereby said wheel-like member can be rotated in either direction.

11. The apparatus defined in claim 9 wherein the tray means is supported at the center of said wheel-like member by a plurality of suspension means mounted inside the wheel-like member.

12. The apparatus defined in claim 8 wherein the tray means is made of metal.

13. The apparatus defined in claim 12 wherein the tray means is made of aluminum alloy or stainless steel.

14. An apparatus for forming and shaping a workpiece made of thermoformable plastic material, which comprise:

(a) a base means;

(b) a positioning means supported by said base means;

(c) a tray means for supporting a raw workpiece, said tray means being supported by said positioning means;

(d) a first pair of dies supported by said base means;

(e) a press platen means;

(f) a second pair of dies mounted on said press platen means;

(g) actuator means for moving said tray means whereby said tray means may be moved to a first position and to a second position between said pairs of dies; and (h) means for moving said press platen means whereby said first pair of dies and said second pair of dies may be closed against said raw workpiece and said tray means.

15. The apparatus defined in claim 14 wherein the positioning means comprises two frame members slidably supported by said base means and the tray means is supported midway between said frame members.

16. The apparatus defined in claim 15 wherein said frame members comprises a horizontal member and two vertical positioning posts.

17. The apparatus defined in claim 14 wherein the tray means is made of metal.

18. The apparatus defined in claim 14 wherein the tray means is made of aluminum alloy or stainless steel.

19. The apparatus defined in claim 14 wherein the tray means has a plurality of work stations, one of said work stations for supporting a real workpiece and the remaining work stations for supporting dummy workpieces.

* * * * *